United States Patent
Beyer

(10) Patent No.: US 10,851,892 B2
(45) Date of Patent: Dec. 1, 2020

(54) METHOD OF ESTIMATING TORQUE IN A CONTINUOUSLY VARIABLE TRANSMISSION

(71) Applicant: Perkins Engines Company Limited, Peterborough (GB)

(72) Inventor: Michael Beyer, Chillocothe, IL (US)

(73) Assignee: Perkins Engines Company Limited, Peterborough (GB)

( * ) Notice: Subject to any disclaimer, the term of this patent is extended or adjusted under 35 U.S.C. 154(b) by 181 days.

(21) Appl. No.: 16/305,354

(22) PCT Filed: Jun. 12, 2017

(86) PCT No.: PCT/EP2017/064322
§ 371 (c)(1),
(2) Date: Nov. 28, 2018

(87) PCT Pub. No.: WO2017/216122
PCT Pub. Date: Dec. 21, 2017

(65) Prior Publication Data
US 2020/0318735 A1    Oct. 8, 2020

(30) Foreign Application Priority Data
Jun. 14, 2016  (EP) .................................... 16174416

(51) Int. Cl.
*F16H 61/66*  (2006.01)
*F16H 61/468*  (2010.01)
(Continued)

(52) U.S. Cl.
CPC ......... *F16H 61/468* (2013.01); *F16H 61/472* (2013.01); *F16H 61/66* (2013.01);
(Continued)

(58) Field of Classification Search
CPC ....... F16H 2037/0886; F16H 2059/363; F16H 61/66; F16H 61/38; F16H 61/46;
(Continued)

(56) References Cited

U.S. PATENT DOCUMENTS

| | | | | | |
|---|---|---|---|---|---|
| 5,976,054 | A | * | 11/1999 | Yasuoka | ............... B60W 10/06 477/109 |
| 2002/0019692 | A1 | * | 2/2002 | Yasuoka | ............... B60W 30/18 701/55 |

(Continued)

FOREIGN PATENT DOCUMENTS

| | | | | | |
|---|---|---|---|---|---|
| FR | 2918335 | A1 | * | 1/2009 | ............ B60W 10/06 |
| JP | H06 159 490 | A | | 6/1994 | |

(Continued)

*Primary Examiner* — Edwin A Young
(74) *Attorney, Agent, or Firm* — Miller, Matthias & Hull

(57) ABSTRACT

A method is provided for estimating input torque and output torque in a continuously variable transmission having a variator. The method comprising the steps of determining (202) a transmission Input and/or output speed, calculating (204) the speed of each of a plurality of transmission components by reflecting the transmission input and/or output speed through the transmission to each of the plurality of transmission components, and calculating (208) the speed rate of change of each of the plurality of transmission components. The inertia torque of each of the plurality of transmission components is calculated (210) based upon its respective speed rate of change and a predetermined component inertia value (209). The method further comprises the steps of determining (211) a motor torque of the variator, and calculating (212) a transmission input torque and transmission output torque by reflecting the motor torque of the variator through the transmission to the transmission input and output. The calculated transmission Input and output torque values are adjusted (214) to account for the calculated inertia torque values of those of the plurality of transmission (Continued)

components which lie between the variator and the transmission input, and the variator and the transmission output, respectively.

8 Claims, 2 Drawing Sheets

(51) Int. Cl.
| | |
|---|---|
| *F16H 61/472* | (2010.01) |
| *F16H 63/50* | (2006.01) |
| *F16H 59/70* | (2006.01) |
| *F16H 37/08* | (2006.01) |
| *F16H 59/36* | (2006.01) |

(52) U.S. Cl.
CPC ..... *F16H 63/50* (2013.01); *F16H 2037/0886* (2013.01); *F16H 2059/363* (2013.01); *F16H 2059/704* (2013.01); *F16H 2200/2007* (2013.01)

(58) Field of Classification Search
CPC .... F16H 61/462; F16H 61/465; F16H 61/468; F16H 61/47; F16H 61/472; B60W 10/04; B60W 10/103; B60W 10/11
See application file for complete search history.

(56) References Cited

U.S. PATENT DOCUMENTS

| | | |
|---|---|---|
| 2002/0132697 A1 | 9/2002 | Reuschel et al. |
| 2002/0173895 A1 | 11/2002 | Kitaori et al. |
| 2004/0107771 A1 | 6/2004 | Kawamura et al. |
| 2006/0017414 A1* | 1/2006 | Joe ................ B60W 20/00 318/432 |
| 2007/0082782 A1 | 4/2007 | Eguchi et al. |
| 2008/0027614 A1* | 1/2008 | Field ................ B60W 10/04 701/60 |
| 2015/0148157 A1 | 5/2015 | Takahashi et al. |

FOREIGN PATENT DOCUMENTS

| | | |
|---|---|---|
| JP | H08 200 461 A | 8/1996 |
| JP | 4 277 424 B2 | 6/2009 |
| JP | 5 027 772 B2 | 9/2012 |

\* cited by examiner

US 10,851,892 B2

METHOD OF ESTIMATING TORQUE IN A CONTINUOUSLY VARIABLE TRANSMISSION

CROSS-REFERENCE TO RELATED APPLICATION

This Application is a 35 USC § 371 US National Stage filing of International Application No. PCT/EP2017/064322 filed on Jun. 12, 2017 which claims priority under the Paris Convention to European Patent Application No. 16174416.4 filed on Jun. 14, 2016.

FIELD OF THE INVENTION

The present Invention is directed to the field of vehicles, and more specifically vehicles which employ a continuously variable transmission having a variator. The invention provides a method of more accurately estimating torque in such transmissions.

BACKGROUND OF THE INVENTION

A continuously variable transmission (CVT) will often have multiple ranges therein. During operation in the lower ranges of the CVT a variator can accelerate through the ranges relatively quickly. The more ranges a CVT has, the greater the rate of acceleration of the variator through those ranges. Consequently, it is advantageous to estimate the transient torque in the CVT and thus control the input from a prime mover (e.g. Internal combustion engine or electric motor) and/or the variator so as to avoid any "torque holes" or torque deficits in the transmission due to the high rate of acceleration of the variator through the lower ranges in particular.

However, with a CVT having multiple ranges the accuracy of such torque estimates is reduced due to the inertia of the variator and CVT components such as transmission shafts and planetary gears and associated carriers, for example. It is therefore an aim of the present invention to obviate or mitigate this disadvantage of existing CVT torque estimation methods.

JP4277424 discloses an arrangement for reducing friction losses in a belt-type CVT in which torque estimate calculations take into account inertia, but the disclosed method does not include calculating the inertia torque of a plurality of transmission components within the CVT and adjusting the torque estimates accordingly.

SUMMARY OF THE INVENTION

According to the present invention there is provided a method of estimating input torque and output torque in a continuously variable transmission having a variator. The method comprises the steps of determining a transmission input and/or output speed, calculating the speed of each of a plurality of transmission components by reflecting the transmission input and/or output speed through the transmission to each of the plurality of transmission components, and calculating the speed rate of change of each of the plurality of transmission components. The Inertia torque of each of the plurality of transmission components is calculated based upon its respective speed rate of change and a predetermined component inertia value. The method further comprises the steps of determining a motor torque of the variator, and calculating a transmission input torque and transmission output torque by reflecting the motor torque of the variator through the transmission to the transmission input and output. The calculated transmission input and output torque values are then adjusted to account for the calculated inertia torque values of those of the plurality of transmission components which lie between the variator and the transmission input, and the variator and the transmission output, respectively.

BRIEF DESCRIPTION OF THE DRAWINGS

A preferred embodiment of the present invention will now be described, by way of example only, with reference to the following drawings.

DETAILED DESCRIPTION OF THE DRAWINGS

Figure 1:
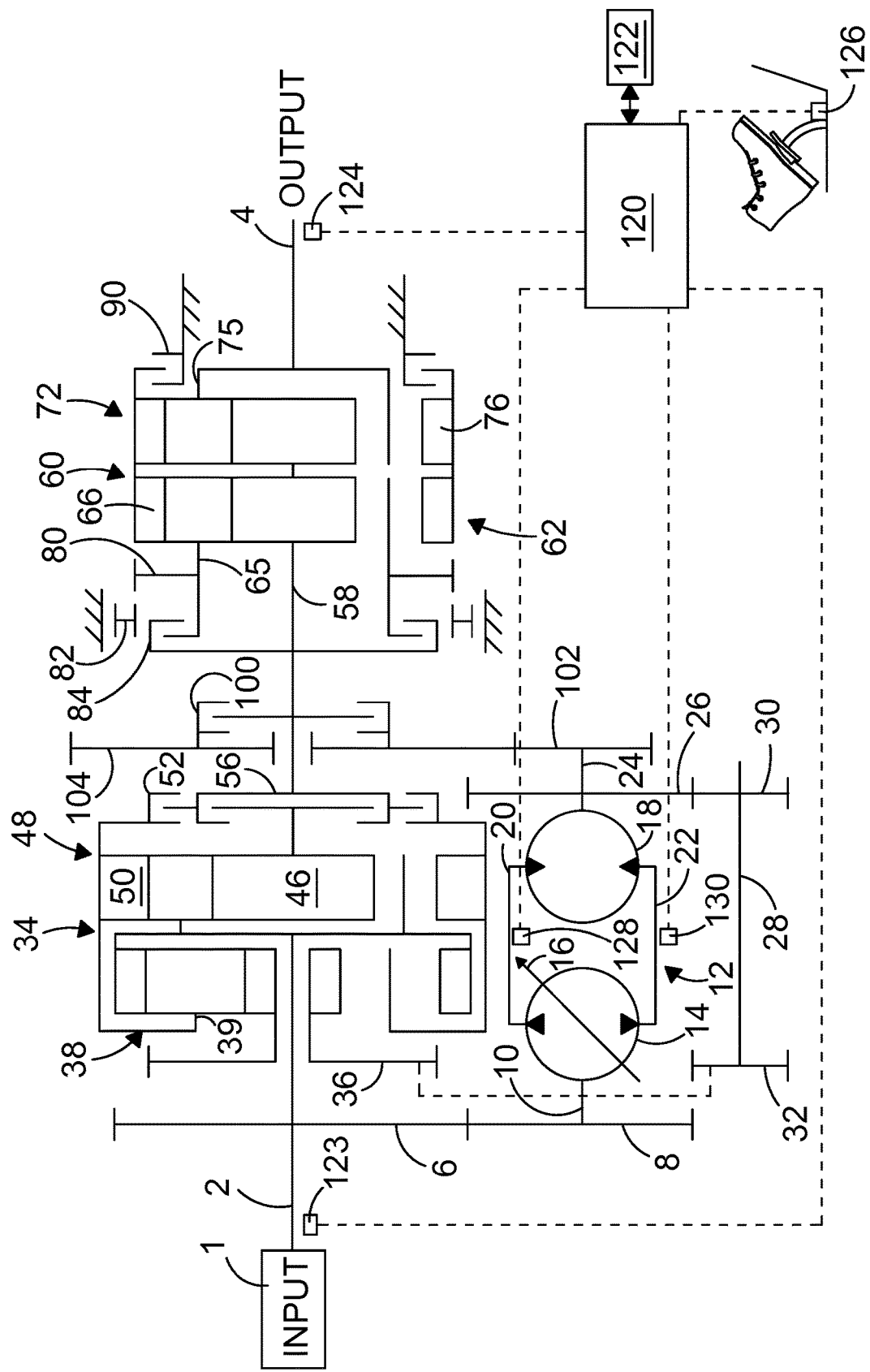
FIG. 1 is a schematic view of a continuously variable transmission.

FIG. 1 schematically Illustrates an example of a continuously variable transmission (CVT) which may be controlled using the method of the present invention. However, it should be understood that the method of the present invention is not intended for application solely with the specific CVT arrangement shown here. For example, although the variator described below is a hydro-mechanical variator other types of variator may be used. Appropriate alternative variators would be electrical and mechanical variators, for example.

The transmission comprises a transmission input shaft 2 which is connected to a prime mover 1 (e.g. internal combustion engine, electric motor) of a vehicle, and a transmission output shaft 4 which will be connected to a load (not shown) such as the wheels of the vehicle. The input shaft 2 carries an input gear 6 which is meshed with a first satellite gear 8 which is carried on a variator input shaft 10 which lies in parallel to the input shaft 2. The input shaft 10 drives a variator, generally designated 12, which in this example is a hydrostatic variator. The variator 12 comprises a variable-volume pump 14 which is driven by the input shaft 10. The pump 14 has a control element or swash plate 16 of a known type, and is connected to a hydraulic motor 18 by a pair of hydraulic lines 20,22. The motor 18 is connected to a variator output shaft 24 which carries a variator output gear 26. A layshaft 28 lies parallel to the variator shafts 10,24 and has a first layshaft gear 30 which meshes with the output gear 26, and a second layshaft gear 32 which meshes with a first sun gear 36 of a summing transmission 34.

The summing, or differential, transmission 34 comprises first and second planetary gear sets 38,48 which represent the first and second, or low and high, ranges of the CVT. A first planet carrier 39 of the first planetary 38 and a second ring gear 50 of the second planetary 48 are connected to an input side of a first connecting component in the form of a first low speed clutch 52. A second sun gear 46 of the second planetary 48 is connected to an input side of a first high speed clutch 56. An intermediate shaft 58 is connected to an output side of a first low speed clutch 52 and the first high speed clutch 56. The intermediate shaft 58 is co-axial with the input and output shafts 2,4.

The first low and high speed clutches 52,56 selectively connect the summing transmission 34 with an output, or range, transmission 60 such that the transmissions 34,60 are co-axial with one another. Both the clutches 52,56 are located in a connecting space defined between the summing and output transmissions 34,60. As stated above, the input side of each of the low and high speed clutches 52,56 is connected to at least one element of the first and/or second planetaries 38,48 of the summing transmission 34. An output side of each of the first low and high speed clutches 52,56 is connected to the intermediate shaft 58, which is co-axial with the transmission input and output shafts 2,4. The output transmission 60 comprises third and fourth planetary gear sets 62,72 which are both connected to the intermediate shaft 58 and represent third and fourth, or low forward and high forward, ranges within the CVT. A third planet carrier 65 of the third planetary 62 is connected to a reverse member 80, which in order to provide a reverse rotation at the output shaft 4 may be selectively held against rotation by a sliding collar 82.

As well as being selectively connected to the intermediate shaft 58, the first low and high speed clutches 52,56 are also selectively connected to the input side of a third connecting component in the form of a second high speed clutch 84. The second high speed clutch 84 is located in the connecting space with the first low and high speed clutches 52,56 and has an output side connected to the third planet carrier 65.

Third and fourth ring gears 66,76 of the third and fourth planetaries 62,72 are connected to one another and also to a second low speed clutch, or braking element, 90. When the second low speed clutch 90 is engaged the third and fourth ring gears 66,76 are prevented from rotating. A fourth planet carrier 75 of the fourth planetary 72 is connected to the output shaft 4.

This exemplary CVT may also include a variator connecting component 100 between the summing and output transmissions 34,60. This variator connecting component 100 is preferably a clutch, which will be referred to as the variator clutch for ease of reference. The variator clutch 100 has an input side connected to the variator output gear 26 by a first intermediate gear 102 which is co-axial with the output gear 26 and is connected to the same variator output shaft 24. A second intermediate gear 104 meshes with the first intermediate gear 102. It is this second intermediate gear 104 which is connected to the input side of the variator clutch 100. The output side of the variator clutch 100 is connected to the second intermediate shaft 58. Thus the variator motor 18 can therefore be connected to the output transmission 60 and output shaft 4 directly via the variator clutch 100 and bypass the summing transmission 34 when the first low and high speed clutches 52,56 are both disengaged.

Also shown in FIG. 1 are control components which may be employed to carry out the method of the present invention. The method steps are carried out by an electronic control unit (ECU) or controller 120 which is in two-way communication with a RAM memory 122. The memory 122 stores data which is processed in the method, as will be explained in more detail below. At least one rotational input speed sensor 123 is located adjacent the transmission input 2 so as to provide the controller 120 with signals regarding the present speed of the transmission input. At least one rotational output speed sensor 124 is located adjacent the transmission output 4 so as to provide the controller 120 with signals regarding the present speed of the transmission output. At least one operator demand sensor 126 is located in the operator environment of the vehicle, and sends signals to the controller 120 when the operator makes a power demand. The demand sensor 126 may be located in order to measure movement of an accelerator pedal (as shown) or a hand control, for example. Finally, a pair of pressure sensors 128,130 are located in each of the hydraulic lines 20,22 of the variator 12 so as to send signals to the controller regarding pressure changes within the variator.

Figure 2:
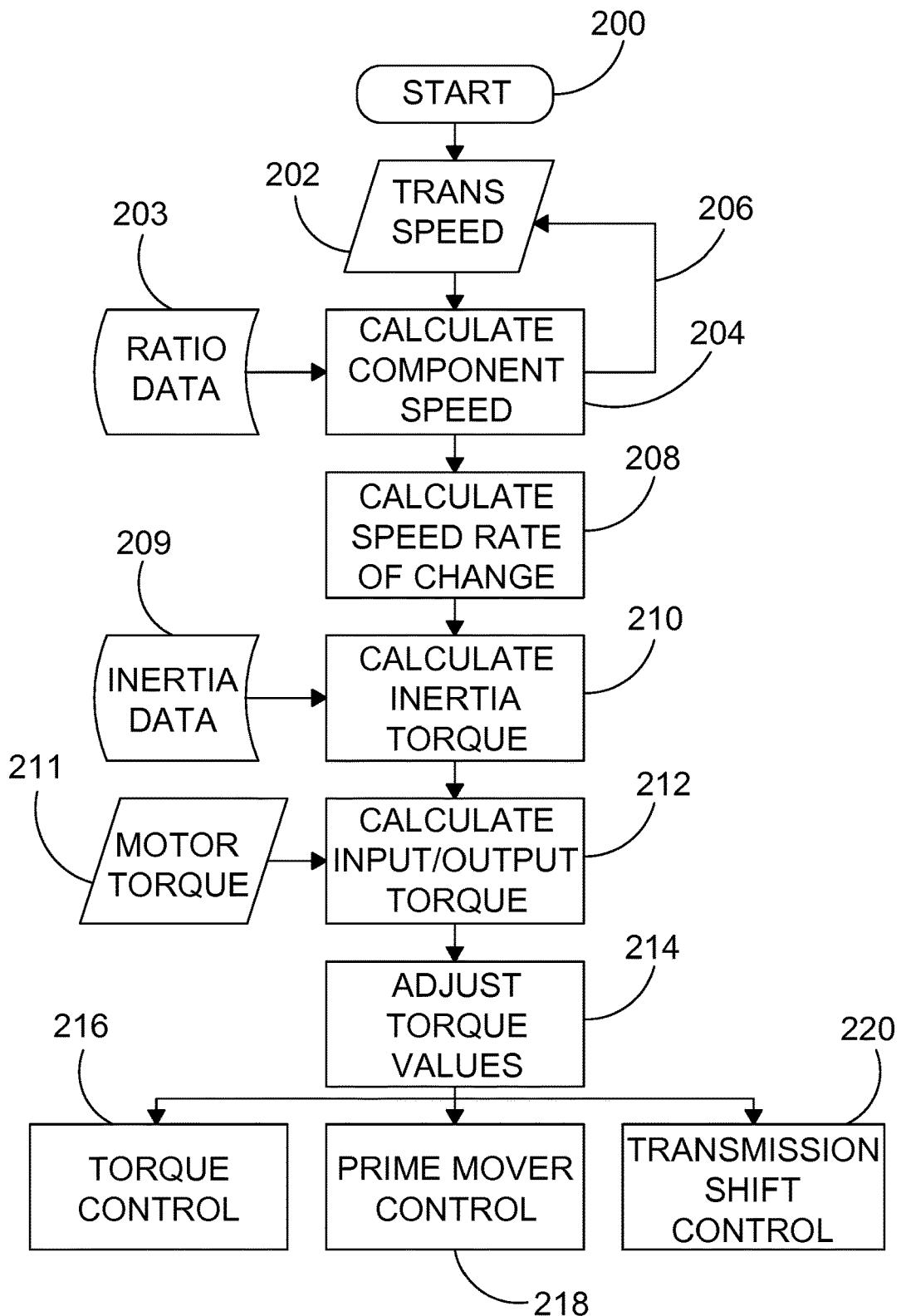
FIG. 2 is a flowchart illustrating the steps of a method of estimating torque in the transmission shown in FIG. 1.

FIG. 2 shows a flowchart detailing the steps taken by the controller 120 when employing a method for estimating torque in a CVT such as that shown in FIG. 1. Firstly, following commencement step 200 the transmission input and/or output speed (i.e. the speed of the input and output shafts 2,4 in FIG. 1) is measured by the input and/or output speed sensors 123,124 or calculated and input into the method as received data at input step 202. The controller 120 already has stored data 203 in memory 122 relating to the ratios between the various planetary gear sets 38,48,62,72 and at processing step 204 the method uses that data 203 to calculate the speed of a plurality of components within the transmission based on the transmission input and/or output speeds. This is done by "reflecting" the transmission speed forwards or backwards through the various ratios in the CVT from either the transmission input or output. In other words, by applying those ratios in reverse it is possible to use the transmission output speed to calculate the speed of any component in the transmission.

For gear meshing relationships (i.e. where two gear cogs are engaged directly with one another) the speed may be reflected through that relationship using the following calculation:

Speed $a = -(Nb/Na) \times$ Speed $b$ where:
Speed a=the rotational speed of gear "a"
Speed b=the rotational speed of gear "b"
Na=No. of teeth on gear "a"
Nb=No. of teeth on gear "b"

For planetary gear arrangements the speed may be reflected through the planetary gear components using the following calculation:

Speed Sun=Speed Carrier$\times((Nr/Ns)+1)$−Speed Ring$\times (Nr/Ns)$ where:
Speed Sun=the rotational speed of the sun gear
Speed Carrier=the rotational speed of the planetary carrier
Speed Ring=the rotational speed of the ring gear
Nr=No. of teeth on the ring gear
Ns=No. of teeth of the sun gear Process loop 206 monitors the change in the estimated component speeds over a predetermined period of time, which then allows a further process step 208 to calculate the speed rate of change of those components.

The memory 122 also stores data 209 relating to predetermined moment of inertia values for each transmission component. That data 209 is utilised in process step 210 along with the calculated speed rate of change values from step 208 in order to calculate the inertia torque (T) of each transmission component. The formula used for the calculation is:

$T = Ia$ where:
I=moment of inertia
a=acceleration (speed rate of change)

Pressure readings from the pressure sensors 128,130 in the variator 12 allow a change in pressure across the variator to be determined, which can then be used to calculate motor torque output from the variator using the formula T=sign($\omega$), where $\omega$ is the angular velocity of the variator output shaft 24. This motor torque data is provided to the controller 120 at input step 211. At process step 212 the method then can estimate the torque at both the transmission input 2 and transmission output 4 by reflecting the calculated motor torque at the variator back or forward through the transmission as necessary. In other words, by applying the predetermined ratios from input step 203 it is possible to use the variator motor torque to calculate the torque at the transmission input and output.

For gear meshing relationships the torque may be reflected through that relationship using the following calculation:

$$\text{Torque } a = (Na/Nb) \times \text{Torque } b$$

where:
Torque a=the torque of gear "a"
Torque b=the torque of gear "b"
Na=No. of teeth on gear "a"
Nb=No. of teeth on gear "b"

For planetary gear arrangements the torque may be reflected through the planetary gear components using the following calculation:

$$\text{Torque } R = (Nr/Ns) \times \text{Torque } S$$

where:
Torque S=the torque of the sun gear
Torque R=the torque of the ring gear
Nr=No. of teeth on the ring gear
Ns=No. of teeth of the sun gear At final process step 214 the calculated transmission input and output torque values from step 212 are adjusted to account for the calculated inertia torque values from step 210 for the plurality of transmission components which lie between the variator and the transmission input, and the variator and the transmission output, respectively. In other words, the inertia torque of each component lying between the input or output and the variator is subtracted from the input or output torque figure. Thus, a more accurate estimation of the input or output torque of the CVT is provided.

Whilst not essential to the invention the method may further comprise some additional control steps which take place after the torque estimation has been completed, and in response to the torque estimates provided. At torque control process step 216 the adjusted transmission output torque value is applied in order to control the motor torque of the variator. At prime mover control process step 218 the adjusted transmission input torque value is applied in order to prepare the prime mover for an anticipated power demand. Finally, at transmission shift torque control process 220 the calculated inertia torque values are applied in order to prepare the prime mover for an anticipated transmission shift event.

By calculating inertia torque values for the components within the CVT, and then adjusting estimated transmission torque values to take into account the inertia torque, the method of the present invention provides a more accurate estimate of actual torque values within the CVT. These estimates can then allow torque control, prime mover/engine control and shift torque control processes, for example, to compensate more accurately for torque deficits or "torque holes" which may occur as the CVT transitions from launch rapidly through its initial ranges at very least.

Modifications and improvements may be incorporated without departing from the scope of the present invention.

The invention claimed is:

1. A method of estimating input torque and output torque in a continuously variable transmission having a variator, the method comprising the steps of:
   determining a transmission input and/or output speed;
   calculating the speed of each of a plurality of transmission components by reflecting the transmission input and/or output speed through the transmission to each of the plurality of transmission components;
   calculating the speed rate of change of each of the plurality of transmission components;
   calculating the inertia torque of each of the plurality of transmission components based upon its respective speed rate of change and a predetermined component inertia value;
   determining a motor torque of the variator,
   calculating a transmission input torque and transmission output torque by reflecting the motor torque of the variator through the transmission to the transmission input and output; and
   adjusting the calculated transmission input and output torque values to account for the calculated inertia torque values of those of the plurality of transmission components which lie between the variator and the transmission input, and the variator and the transmission output, respectively.

2. The method of claim 1, wherein the step of determining the transmission input and/or output speed comprises measuring the speed of the transmission input and/or output, respectively.

3. The method of claim 1, wherein the step of determining the transmission input and/or output speed comprises calculating a desired transmission input and/or output speed based upon an input signal.

4. The method of claim 3, wherein the input signal comprises an operator demand signal.

5. The method of claim 3, wherein the input signal comprises a measured synchronising clutch speed of a synchronising clutch within the transmission.

6. The method of claim 1, further comprising the step of applying the adjusted transmission output torque value to a torque control process which controls the motor torque of the variator.

7. The method of claim 1, wherein the transmission input is driven by a prime mover, and the method further comprises the step of applying the adjusted transmission input torque value to a prime mover control process in order to prepare the prime mover for an anticipated power demand.

8. The method of claim 7, further comprising the step of applying the calculated inertia torque values to a transmission shift torque management process in order to prepare the prime mover for an anticipated transmission shift event.

\* \* \* \* \*